INVENTOR:
Harold F. Pitcairn
BY
ATTORNEYS.

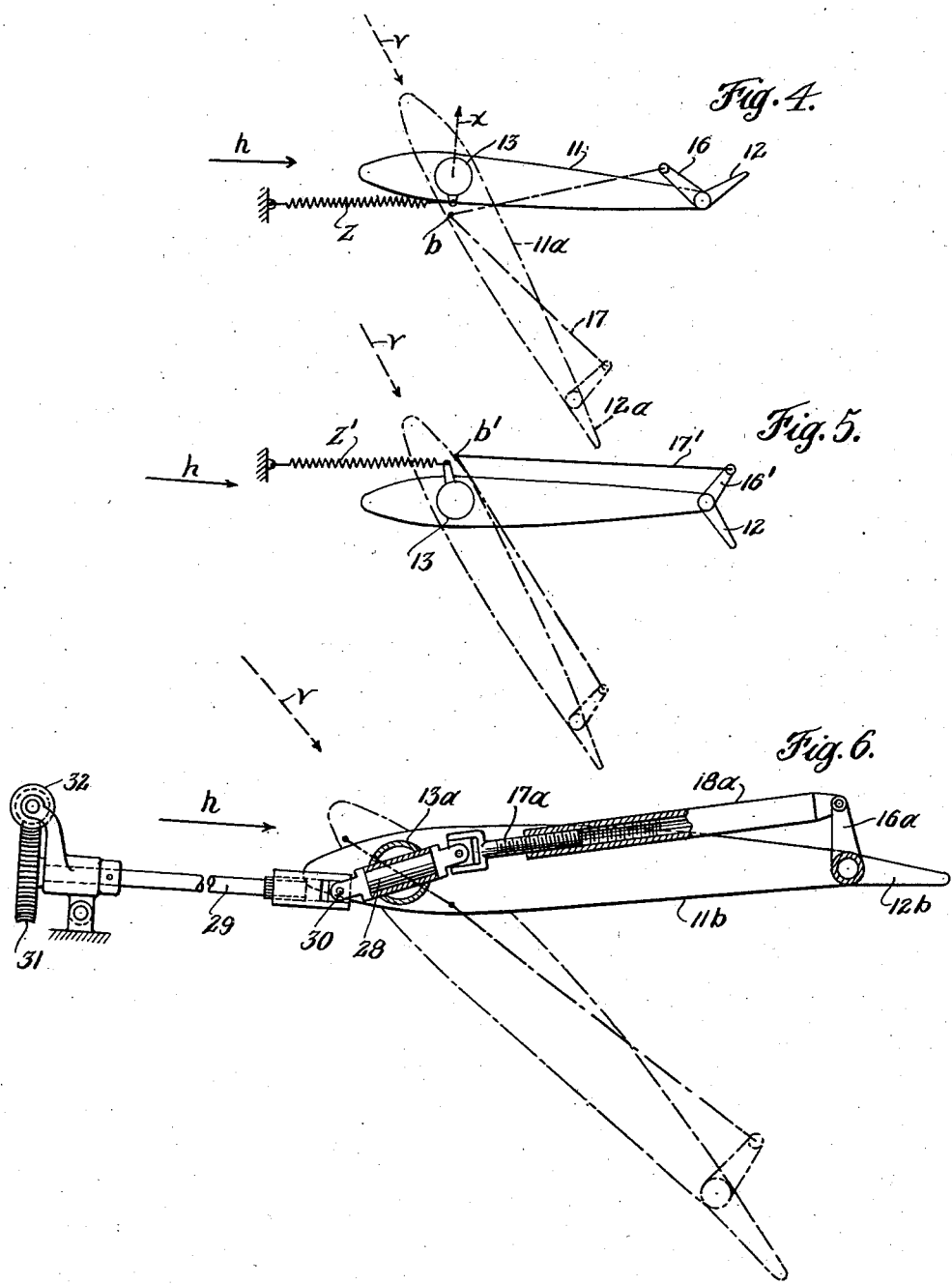

Patented June 18, 1946

2,402,294

UNITED STATES PATENT OFFICE 2,402,294

ROTATIVE WINGED AIRCRAFT

Harold F. Pitcairn, Bryn Athyn, Pa., assignor to Autogiro Company of America, Philadelphia, Pa., a corporation of Delaware Application July 7, 1942, Serial No. 450,008

2 Claims. (Cl. 244—17)

This invention relates to rotative winged aircraft, and is especially concerned with stability of an aircraft adapted to operate under different conditions giving rise to airflow in different directions over the stabilizing surfaces.

For example, rotative winged aircraft, especially of the helicopter type, are commonly adapted to operate under conditions varying from relatively high speed translational flight to hovering flight or flight in a vertical direction. In consequence of these changes in operating conditions, the net direction of airflow over stabilizing surfaces is appreciably altered. Thus, in a helicopter, during translational flight, the direction of airflow over the stabilizing surfaces is more nearly horizontal than when hovering or in vertical flight, since under the latter conditions the downwash from the rotor results in airflow over the stabilizing surfaces in a direction approaching the vertical.

A principal object of the invention is the provision of a stabilizer positioned to be influenced both by the rotor downwash and by the relative airflow set up by translational flight, the said stabilizer being mounted to move to different positions under the influence of changes in direction of the net airflow over the surface of the stabilizer.

The stabilizer is usually incorporated in the tail surfaces of the machine, the stabilizer being provided to assist in maintaining the desired longitudinal attitude of the body. The direction and magnitude of the stabilizing force depend on various characteristics of the aircraft. Thus, in some rotary wing aircraft, a positive lift effect is desired, and in other machines a negative effect or down load is preferred. In still other machines the stabilizing force should normally be neutral, at least under some operating conditions.

However, in a rotative winged aircraft capable of flight under widely differing conditions, a stabilizer which is fixed in a position giving the desired load in one style of flight does not usually provide the preferred condition for a different style of flight.

With the foregoing in mind, the invention contemplates an automatically movable stabilizer which will supply the desired stabilizing force under various different flight conditions. Arrangement of the stabilizer for automatic movement to provide the desired conditions in different styles of flight presents a special problem in a rotative winged aircraft capable of hovering or vertical flight as well as of relatively high speed translational flight, since in an aircraft of this type the changes in direction of net airflow over the stabilizer are of very large magnitude, ranging all the way from a direction approximating the horizontal to a direction approximating the vertical.

According to the invention, the automatic movement of the stabilizer is achieved by mounting the stabilizer to float freely to different positions under the influence of changes in the direction of net airflow.

A further object of the invention is the provision of adjustment means for the stabilizer, providing for variation in the angle at which the stabilizer will float with respect to the net airflow over the surface thereof.

Still further, in accordance with another aspect of the invention, provision is made for automatic change in the effective angle of attack of the stabilizer with respect to the net airflow over the surface thereof, when the stabilizer moves from one position to another. This may take place in either sense depending upon the operating characteristics desired. For instance, in a machine in which the stabilizing force is positive during translational flight, the effective angle of attack of the stabilizer may be automatically reduced when the stabilizer floats to the relatively steep position corresponding to vertical flight.

On the other hand, in some machines, it may be desirable that the stabilizer maintain a substantially uniform angle of attack (with respect to the net airflow) even under widely differing conditions of flight. An arrangement providing this type of operation is also contemplated by the invention, as will further appear.

Election of one or another of the various modes of operation of the stabilizer will depend upon the type of machine in which the invention is used and on the operating characteristics desired.

How the foregoing objects and advantages are attained, together with others which will occur to those skilled in the art, will be apparent from the following description, referring to the accompanying drawings, in which—

Figure 4 is a diagrammatic view illustrating the action of the stabilizer under different conditions;

Figure 5 is a somewhat diagrammatic view similar to Figure 4, but illustrating a modification; and Figure 6 is a view similar to Figure 2 but illustrating a modification.

Figure 1:
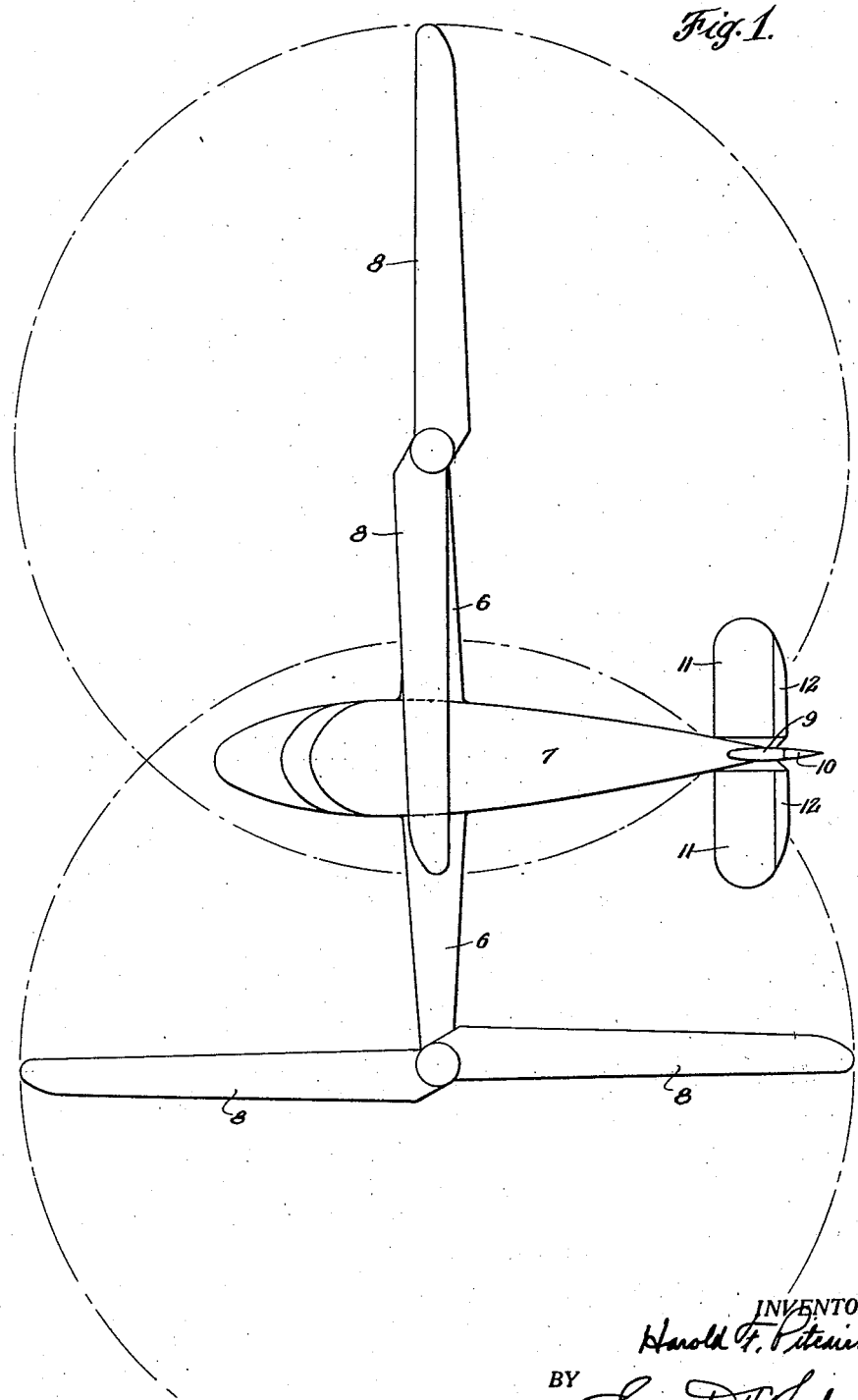
Figure 1 is a top plan outline view of an aircraft having a pair of side-by-side sustaining rotors.

Referring first to the general arrangement of the aircraft as illustrated in Figure 1, the rotors are supported by a pair of outriggers 6—6, one projecting at each side of the fuselage 7. Each rotor, as here shown, is provided with two blades 8, each individual blade preferably being coupled with the rotor hub by means of one or more pivots including, at least, a "flapping" pivot, and preferably also a "drag" pivot.

Although the invention is applicable to rotative winged aircraft of a variety of types, having one or more than one rotor, the two-rotor machine shown in Figure 1 will serve for purposes of illustration. Moreover, the aircraft may or may not be equipped with a propulsive airscrew, the embodiment shown in Figure 1 being of the type in which no propulsive airscrew is employed. In this arrangement, however, the rotors are adapted to be power driven, at least during normal flight, so as to provide for helicopter type operation, and in a machine of this character translational movement of the craft may be effected either by tilting the entire machine forwardly or by tilting the rotor lift lines, so as to secure a horizontal thrust component.

From the foregoing it will be seen that the invention is applicable to a wide variety of types of rotative winged aircraft, the invention being of especial utility in any such aircraft which is capable of operation according to different styles of flight in which the direction of airflow over the stabilizing surfaces changes appreciably, depending upon the particular flight condition.

Returning again to the machine which is shown in Figure 1 for purposes of illustration, it may be mentioned that with an aircraft of this type the rotors are adapted to be driven from an engine usually located in the body, the drive transmission including at least a manually controllable clutch and preferably also an overrunning clutch. The mean rotor blade pitch angle is also preferably adjustable so as to secure best operation under different conditions. The pitch adjustment desirably includes a position in which the rotors will autorotate, thereby permitting descent without power, with the rotors freely overrunning the drive.

Control for maneuvering the aricraft, especially in pitch and roll, is also preferably incorporated in the rotors themselves, as by providing tiltable mounts for the rotor hubs or by providing for periodic differential pitch change of the blades of each rotor, either of which types of control serve to shift the lift lines of the rotor with reference to the center of gravity of the machine, thereby setting up control moments. Examples of such rotor control appear in the copending applications of Juan de la Cierva, Serial No. 645,985, filed December 6, 1932, issued July 31, 1945, as Patent 2,380,580, and Ser. No. 698,372, filed November 16, 1933, issued July 31, 1945, as Patent 2,380,582. The center of gravity in a machine of this type would desirably be located in or close to a transverse vertical plane containing the axes of the two rotors.

In the particular aircraft illustrated, it is contemplated that the two rotors shall be driven in out-of-phase relation, whether the rotors are spaced closely enough to intermesh (as shown) or whether they are more widely spaced, there being certain advantages in such out-of-phase drive which are fully disclosed in copending application of J. A. J. Bennett, Serial No. 242,057, filed November 23, 1938, issued March 28, 1944, as Patent 2,344,967. Certain features of the invention are interrelated with this out-of-phase operation of side-by-side rotors, as will appear hereinafter.

The tail or empennage includes the customary fixed vertical surface 9 with a controllable rudder 10 to the rear thereof. Horizontal stabilizer surfaces 11—11 are disposed at opposite sides of the tail, one being located primarily within the influence of the downwash of one of the rotors and the other primarily within the influence of the downwash from the other rotor. Each of these surfaces is provided with a controllable trailing edge flap 12, the mounting and control means for the stabilizers 11 and flaps 12 being described just below with particular reference to Figures 2 and 3.

Figure 2:
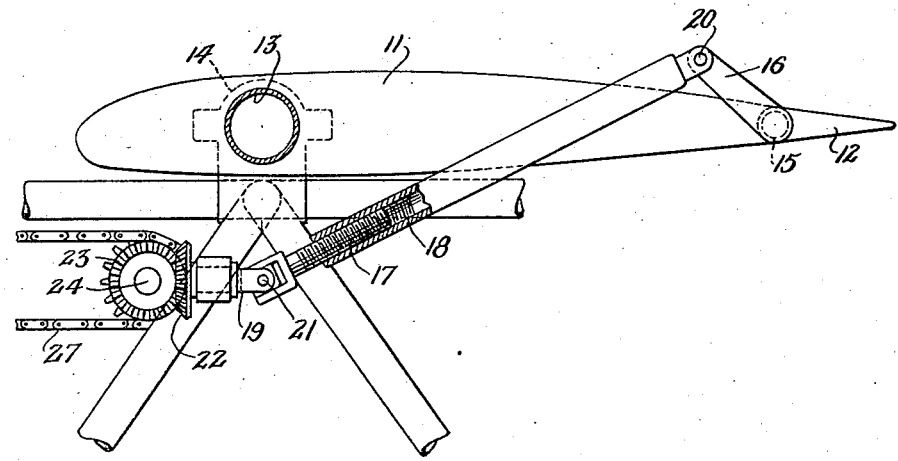
Figure 2 is an enlarged detail view indicating the outline of a horizontal stabilizer and mounting and adjustment parts associated therewith.
Figure 3:
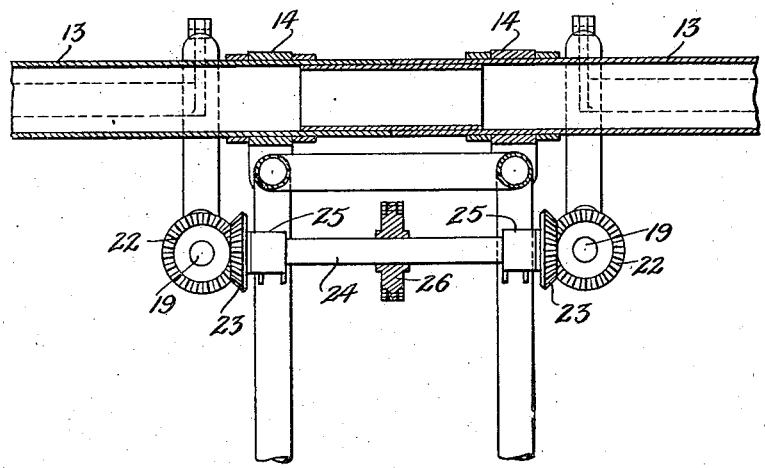
Figure 3 is a fragmentary view of parts shown in Figure 2, the view being partly in section and illustrating mounting and adjustment parts for the stabilizer.

In Figures 2 and 3, it will be seen that each stabilizer 11 is mounted on a transverse tube 13, the two tubes being separately rotatable in appropriate bearings such as indicated at 14. These bearings provide for free floating of the stabilizers. The flap 12 is connected with the stabilizer by means of a pivot 15, the flap being provided with an arm 16 by means of which the flap may be moved upwardly or downwardly. Internal and external cooperating threaded parts 17 and 18 constitute a link interconnecting the free end of arm 16 and a rotatable shaft 19, there being appropriate flexible joints 20 and 21 between said arm and the link and between the link and said shaft.

Shaft 19 carries a bevel gear 22 meshing with bevel gear 23, the two gears being mounted on a common transverse shaft 24 which is journalled in bearings 25. Rotation of shaft 24 thus causes both of the stabilizer flaps 12 to move, the movement of the pair being in the same sense. Manually operable means is preferably provided for rotating shaft 24. Thus, in Figures 2 and 3, a sprocket 26 is mounted on shaft 24, to cooperate with chain 27, which chain may be coupled in any suitable manner with an appropriate manual control at the pilot's position in the body. When the flap adjustment is operated, the threaded part 17 is turned within the threaded sleeve 18, thereby changing the effective length of the link which operates the control arm 16 for the flap.

In analyzing the operation of the foregoing mechanism reference is made to Figure 4, in which the essentials of Figure 2 are indicated. In Figure 4 various of the parts are diagrammed in two different positions. The full line showing illustrates adjustment of the stabilizer flap 12 to a position in which the stabilizer assumes a positive angle with respect to the net airflow during translational flight at an appreciable speed. The direction of this airflow is indicated by the arrow $h$. Since the axis on which the stabilizer is mounted is located well forwardly of the stabilizer, the relative flight wind will maintain the position indicated. The effective aerodynamic angle of attack of the stabilizer being positive with reference to the flight wind $h$, a positive (tail up) stabilizing force is imposed on the body of the machine to the rear of the center of gravity. This stabilizing force is indicated in Figure 4 by the arrow $x$.

Assume now that the condition of flight changes to one of steep ascent. At this time the effect of the downwash from the rotor or rotors is more pronounced, so that the direction of the net airflow shifts to the position indicated by the arrow v. This causes the stabilizer 11 to float to a steeper position, as indicated at 11a.

Attention is now directed to the fact that with the above described type of control linkage for the stabilizer flap, the flap is caused to move with reference to the stabilizer when the stabilizer floats from the position indicated at 11 to the position indicated at 11a (in Figure 4). In achieving this automatic change in position of the flap, it is important that the forward end of link 17—18 be coupled with the operating mechanism at a point offset from the axis on which the stabilizer floats. This point is indicated by the letter b in Figure 4, from which it will be seen that it is located well below the center of the tube 13 for mounting the stabilizer. In consequence of the arrangement, as the stabilizer moves to the steeper position (11a) the flap 12 is caused to move downwardly with reference to the stabilizer, as is indicated at 12a. The effect of this is to cause the stabilizer to float at a lower angle with reference to the airflow v than with reference to the airflow h. For the purposes of this illustration, the stabilizer position 11a may be considered as an approximately neutral position (with respect to the net airflow v).

From the foregoing it will be seen that in accordance with one condition contemplated by this invention, the stabilizer may provide a positive lift effect during high speed translational flight and may then automatically adjust itself to a substantially neutral position (with respect to the net airflow) upon a change to the condition of vertical or hovering flight. A different initial setting of the flap, in the arrangement as illustrated in Figure 4, may be employed to establish somewhat different conditions from those described above when the stabilizer moves from a relatively flat to a relatively steep position.

Moreover, if desired, the flap may be adjusted by the pilot at the time the flight condition changes, in order to meet various different operating conditions. For example, if the flap is adjusted when the stabilizer moves from the flat position to the steep position, the angle at which the stabilizer will float with respect to the net airflow may be maintained substantially uniform.

The axis of floating of the stabilizer may be located chordwise of the stabilizer at or close to the center of pressure, and the combination of the automatic movement of the stabilizer tab affecting the position of the stabilizer, and the aerodynamic forces acting on the stabilizer may be relied upon to maintain the desired stabilizer position. Alternatively, it is contemplated that the axis of floating shall be located ahead of the center of pressure, in which event it is advantageous, as indicated in Figure 4, to employ a bias, such as a spring, so that the stabilizer would take up a position representing a balance between the aerodynamic forces and the force applied by the bias device. Thus, in Figure 4, bias spring z is so coupled with the stabilizer as to tend to urge the stabilizer toward a positive incidence position. The characteristics of this spring are desirably such that only a relatively small variation in biasing force occurs when the stabilizer floats from one position to another.

Damping means, such as friction applied at the bearing for mounting the stabilizer may also be employed, to restrain the stabilizer as against minor vibrations or flutter. Other means may be utilized for this purpose, as will occur to those skilled in the art, for instance, a dashpot.

Figure 5 is similar to Figure 4 but illustrates an arrangement modified to set up a negative load during translational flight, and a substantially neutral setting for hovering or vertical flight. For this purpose, the linkage for controlling the trailing edge flap is re-arranged as compared with the showing of Figure 4. Thus, in Figure 5, point b' is offset from the axis of floating of the stabilizer in the direction above the stabilizer instead of below, as in Figure 4. Moreover, the link 17' and arm 16' are re-arranged to deflect the trailing edge tab 12 in a sense opposite to that provided by Figure 4, when the stabilizer floats from one position to another.

In Figure 5, the bias spring z' is re-located so that it now sets up a biasing force in a sense opposite to that of Figure 4. The bias spring, as above indicated, is advantageous where the center of pressure of the stabilizer lies to the rear of the axis on which the stabilizer floats.

Figures 4 and 5 illustrate two different arrangements, one of which may be of use in machines of one design and the other of use in machines of another design.

Still further, in certain aircraft depending upon the characteristics thereof and the nature of the operation desired, it may be desirable to arrange the parts so that the trailing edge flap does not move with reference to the stabilizer to the degree provided by the arrangement of Figures 2, 3, 4 and 5. This may be accomplished merely by re-arranging the control linkage for the stabilizer flap, and especially by bringing the point b (Figure 4) or point b' (Figure 5) closer to the axis on which the stabilizer floats. In fact, for some purposes, it may be desirable to normally maintain a given relationship between the trailing edge flap and the stabilizer for all positions of the stabilizer, in which event the control linkage may be arranged to intersect the axis on which the stabilizer floats, an example of such a mechanism being described hereinafter with reference to Figure 6.

Before considering the modification of Figure 6, it is pointed out that the features above described with reference to Figures 1 to 5 are applicable where only a single stabilizer is employed, or where a pair of stabilizers is used, but constrained to float in unison. However, in a machine such as shown in Figure 1, equipped with a pair of side-by-side rotors, a pair of independently movable stabilizers is desirably employed, one being positioned primarily within the influence of the downwash from one rotor and the other being positioned primarily within the influence of the downwash from the other rotor, as above mentioned. Separate mountings for the two stabilizers, therefore, permit each to assume its own position in accordance with the airflow prevailing at that side of the machine. Moreover, where the two rotors are driven in out-of-phase relation, the downwash at opposite sides will fluctuate alternately, but notwithstanding this irregularity of airflow over the two stabilizers, the independent mounting thereof, as described with reference to Figures 1 to 3, will still maintain substantial uniformity of stabilizing force as between the two sides.

In the arrangement of Figure 6, the stabilizer is indicated at 11b and the flap at 12b. The stabilizer is again mounted by means of a tube 13a and is free to float in accordance with changes in direction of airflow, as before. The control for the flap 12b again includes an arm 16a and a pair of cooperating threaded parts 17a and 18a. The forward end of part 17a, however, is here coupled with a shaft 28 with its axis intersecting the axis of the mounting tube 13a for the stabilizer. This may be arranged either by having shaft 28 actually pass through tube 13a, or by locating the control at one end of the mounting tube. Shaft 28 is coupled with shaft 29 through a flexible joint 30, shaft 29 being adapted to be rotated by a worm wheel 31 meshing with a worm 32 located at the pilot's position so that the flap may be adjusted in flight.

With the arrangement just described, movement of the stabilizer does not cause the flap to assume a new relative position. In view of this, the stabilizer will always assume the same effective angle of attack with reference to the direction of airflow ($h$ or $v$).

Although the flap 12b may be adjusted to different positions from that illustrated in Figure 6, the setting shown in that figure illustrate a condition where the effective angle of the stabilizer with respect to the net airflow is approximately neutral, this angle being maintained even throughout a wide range of flight conditions.

As in the other forms described, a given adjustment of the flap may be maintained, thereby predetermining the condition under different flight conditions or, if desired, the adjustment may be operated by the pilot when the style of flight changes, for instance, from hovering flight to translational flight.

I claim:

1. In a rotative winged aircraft capable of flight under different conditions, one of which is distinguished from another by a downwash from the rotor in a steep or generally vertical direction, a floating stabilizer to the rear of the rotor center positioned to be influenced both by rotor downwash and by relative airflow set up by translational flight of the craft, the stabilizer being mounted on a generally horizontal pivot the axis of which is located toward the leading edge of the stabilizer and provides freedom for pivotal floating movement of the stabilizer between generally horizontal and generally upright positions, an adjustable trailing edge tab pivoted on the stabilizer, a rotative control member for adjusting said tab located generally vertically below the stabilizer pivot, and connections between said control member and the tab including an actuating lever connected with the tab and extended above the tab pivot, a push-pull connection comprising a pair of threaded telescopic members extended at an angle to the stabilizer from the free end of the lever to a position adjacent the said rotative control member below the stabilizer pivot, and a universal joint interconnecting the rotative control member and the said push-pull connection.

2. A construction according to claim 1 and further including a yielding bias device normally urging the stabilizer to move on its mounting pivot in a direction toward its generally upright position.

HAROLD F. PITCAIRN.